(12) United States Patent
Stefansky et al.

(10) Patent No.: US 6,317,296 B1
(45) Date of Patent: Nov. 13, 2001

(54) MAGNETIC PARKING DEVICE FOR DISK DRIVE

(75) Inventors: Frederick Mark Stefansky, Longmont; Richard B. Balsley, Jr., Boulder; Robert W. Yates, Boulder; Steven R. Speckmann, Boulder, all of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 1353 days.

(21) Appl. No.: 08/501,542

(22) Filed: Jul. 12, 1995

Related U.S. Application Data

(63) Continuation of application No. 08/109,076, filed on Aug. 19, 1993, now abandoned.

(51) Int. Cl.[7] .................................................. G11B 21/22
(52) U.S. Cl. ..................................... 360/256.2; 360/256.3
(58) Field of Search ................................... 360/104, 105, 360/106, 256.2, 256.3; 335/170, 179, 229

(56) References Cited

U.S. PATENT DOCUMENTS

| | | | |
|---|---|---|---|
| 3,671,893 | * 6/1972 | Edgar et al. ........................ | 335/179 |
| 3,738,262 | * 6/1973 | Dayger et al. ..................... | 101/93 C |
| 3,899,061 | * 8/1975 | Krug ................................. | 192/84 PM |
| 4,635,151 | 1/1987 | Hazebrouck ........................ | 360/105 |
| 4,639,863 | 1/1987 | Harrison et al. .................... | 364/200 |
| 4,660,120 | 4/1987 | Manzke et al. ..................... | 360/137 |
| 4,710,834 | 12/1987 | Brand et al. ........................ | 360/105 |
| 4,853,807 | 8/1989 | Trager ............................... | 360/97.01 |
| 4,881,139 | * 11/1989 | Hazebrouck ........................ | 360/105 |
| 4,890,176 | 12/1989 | Casey et al. ........................ | 360/105 |
| 4,989,108 | * 1/1991 | Chang ............................... | 360/105 |
| 5,023,736 | * 6/1991 | Kelsic et al. ........................ | 360/105 |
| 5,024,543 | * 6/1991 | Mitsuishi et al. ................... | 400/124 |
| 5,034,837 | * 7/1991 | Schmitz ............................. | 360/105 |
| 5,162,959 | * 11/1992 | Arin et al. ......................... | 360/105 |
| 5,170,300 | * 12/1992 | Stefansky ........................... | 360/105 |
| 5,262,912 | * 11/1993 | Hudson et al. ..................... | 360/105 |
| 5,361,182 | * 11/1994 | Sampretro et al. .................. | 360/105 |
| 5,448,435 | * 9/1995 | Nakazawa et al. ................. | 360/105 |
| 5,452,159 | * 9/1995 | Stefansky ........................... | 360/105 |
| 5,452,162 | * 9/1995 | Campbell et al. ................... | 360/105 |

FOREIGN PATENT DOCUMENTS

| | | |
|---|---|---|
| 2 170 644 A | 8/1986 | (GB) . |
| 2-105375 | * 4/1990 | (JP) ..................................... 360/104 |
| WO 90/05360 | 5/1990 | (WO) . |

OTHER PUBLICATIONS

"Actuator Lock / Crash Stop Utilizing Solenoids", IBM Technical Disclosure Bulletin, pp. 350–351, Dec. 1992, New York, United States of America.

Actuator Retraction Device—IBM Technical Disclosure Bulletin, vol. 19, No. 4, Sep. 1976, p. 1440.

* cited by examiner

Primary Examiner—William Klimowicz
(74) Attorney, Agent, or Firm—Derek J. Berger; Jonathan E. Olson; Shawn B. Dempster

(57) ABSTRACT

A magnetic parking device for retaining an actuator in a disk drive over a landing zone. A magnetically permeable capture member is provided on the drive actuator and a magnetic parking member for capturing and magnetically retaining the capture member to park the transducer is provided adjacent the drive actuator. The magnetic parking member includes a permanent magnet and a magnetic field containing member having a slot (or air gap) formed therein. The magnetic field containing member and permanent magnet form a magnetic circuit with a magnetic flux with the slot in the magnetic field containing member allowing a portion of the magnetic flux to extend beyond the physical confines of the magnetic field containing member to provide a capture region for the capture member. When the actuator moves into a position where the transducer is over a landing zone, the capture member enters the capture region adjacent the air gap and becomes part of the magnetic circuit formed by the magnetic field containing member and the permanent magnet. A bucking coil is provided, arranged about the magnet, for passing a current to generate a magnetic field with polarity opposite that provided by the permanent magnet to neutralize the magnetic field to release the actuator from the parked state.

3 Claims, 7 Drawing Sheets

MAGNETIC PARKING DEVICE FOR DISK DRIVE

This application is a continuation of Ser. No. 08/109,076, filed Aug. 19, 1993, now abandoned.

CROSS-REFERENCE TO RELATED APPLICATIONS

THIN LINE MICRO HARD DISK ARCHITECTURE, Ser. No. 07/527,590, filed May 23, 1990, now abandoned, inventors Frederick Mark Stefansky, Bernard A. Rusik, Glade N. Bagnell, Steve Speckmann, assigned to the assignee of the present application;

LATCH MECHANISM FOR DISK DRIVES, Ser. No. 07/464,696, filed Sep. 18, 1989, now U.S. Pat. No. 4,979,062, inventors Frederick Mark Stefansky and Glade N. Bagnell, assigned to the assignee of the present application;

MAGNETIC PARKING DEVICE FOR DISK DRIVE, U.S. Pat. No. 5,178,300, inventor Frederick Mark Stefansky, assigned to the assignee of the present application;

VOICE COIL ACTIVATED DISK DRIVE PARKING DEVICE WITH MAGNETIC BIAS, U.S. Pat. No. 4,985,793, issued Jan. 15, 1991, inventor Kurt Anderson, assigned to the assignee of the present application;

DISK DRIVE SOFTWARE SYSTEM ARCHITECTURE, Ser. No. 07/790,008, now abandoned, which is a file wrapper continuation of Ser. No. 07/488,386, now abandoned, which is a file wrapper continuation of Ser. No. 07/057,806, filed Jun. 2, 1987, now abandoned, inventors John P. Squires, Thomas A. Fiers and Louis J. Shrinkle, assigned to the assignee of the present application;

DISK DRIVE SOFTWARE SYSTEM ARCHITECTURE UTILIZING IMBEDDED REAL TIME DIAGNOSTIC MONITOR, U.S. Pat. No. 4,979,055, issued Dec. 18, 1990, inventors John P. Squires, Thomas A. Fiers and Louis J. Shrinkle, assigned to the assignee of the present application.

DISK DRIVE SYSTEM CONTROL ARCHITECTURE, U.S. Pat. No. 4,979,056, inventors John P. Squires, Thomas A. Fiers and Louis J. Shrinkle, issued Dec. 18, 1990, assigned to the assignee of the instant application.

Each of the above-mentioned applications is hereby specifically incorporated by reference.

BACKGROUND OF THE INVENTION

1. Field of the Invention

The present invention relates to parking devices which position and retain the head(s) of a disk drive over a selected portion of a hard (or fixed) disk when the disk drive is not in use.

2. Description of the Related Art

Developments in personal computers, portable computers and lap top computers have prompted reductions in the size and increases in the memory capacity of disk drives. Factors which hamper the incorporation and use of fixed or hard disks in lap-top computers include the size, weight, and power consumption of hard disk drives. The desire to operate portable computers on battery supplied power, and the reduction of the life of the batteries by each power consuming component of a computer, have prompted efforts to reduce the power consumed by disk drives intended for use in portable computers.

Conventional hard disk drives often incorporate a device for parking the head(s) of the drive. As used in this patent, the terms "park" and "parking" refer to the maintaining the position of the head(s) over a selected portion (usually a "landing zone" at the inside or outside diameter) of the disk (or disks). The heads are supported by an actuator, and parking the heads also means parking the actuator by fixing the position of the actuator which supports the heads.

In conventional disk drives, a head "flies" over the surface of a disk, riding on the stream of air created by the rotation of the disk. When the disk stops rotating, for example, when power is turned off, the head lands on the disk. If the head lands on a portion of the disk which is used to store data, there is a possibility that the disk, and thus the data stored on the disk, will be damaged. Thus, retaining the heads over non-data portions of the disk is crucial. Parking the head(s) is particularly important in portable computers, in which the disk drive may be continually subject to large physical shocks during transportation. Non-operational physical shocks, for example, shocks experienced during transportation or shipping of portable computers, may cause the heads to "slap" against the disk, possibly causing a loss of data if the head slaps against a data-carrying portion of the disk. Parking the head assures that the head will land on a landing zone—i.e., a non-data storage portion of the disk—and will be held in a position over the landing zone during the power-down period.

Various types of parking (or latching) devices have been used to lock the actuator arm positioned by a voice coil in a selected position when the disk drive is not operating. Many parking devices incorporate a latch which physically engages the actuator arm. In such devices, a spring is utilized to bias a pivoting latch arm to a parked position and an electromagnet to release the latch during operation of the drive. In one type of latch configuration, an electromagnet is used to release the latch. The use of an electromagnet generally requires the continual use of electrical power to maintain the latch in the unlatched position. Further, an electromagnet generates heat which is not desirable in a disk drive or any other area in a computer.

Air activated parking devices rely on the air flow generated by the rotating disks to release a spring biased latch arm. Air activated parking devices pose the problem of interference with the air flow necessary for the heads to fly properly. Further, the amount of force generated by the air flow is related to the surface area of the disks, and as disks are reduced in size, the amount of air flow may be insufficient to release a latch mechanism.

Solenoids have also been used to release latch arms which are spring biased. As with an electromagnet, a solenoid requires a constant supply of electrical current, and the residual magnetism of the plunger must be overcome by the biasing force.

Such parking devices often utilize pivoting latch arms which often present design, manufacturing, and operational problems related to, for example, balancing the latch arm to provide proper functioning of the latch for all orientations of the disk drive. A latch which does not operate properly for all orientations of the disk drive is not suitable for use in a portable or lap-top computer.

Reliability of electromagnetic parking devices which attract a permeable member requires overcoming any residual magnetism in the permeable member, prompting the use of larger bias springs. However, larger spring forces demand greater electrical power to energize an electromagnet which reliably overcomes the spring force.

Purely magnetic parking devices park the actuator by the attraction by a magnet of a magnetically permeable portion of the actuator. Such parking devices have provided direct contact between the magnetically permeable portion of the actuator and the magnet. The primary drawback of a magnetic latch of this type is that the rotational movement of the actuator is adversely affected by the attraction of the magnetically permeable portion of the actuator and the magnet, thereby creating problems with the track following and seek functions. Further, an extremely large force is required to release the actuator from the magnet.

SUMMARY OF THE INVENTION

An object of the present invention is to provide a parking device which magnetically captures (or parks) the actuator of a disk drive.

A further object of the present invention is to provide a parking device which requires an minimum amount of space in the disk drive.

Another object of the present invention is to provide a parking device which parks the actuator without relying on physical latching of the parking device and the actuator.

Another object of the present invention is to provide a magnetic parking device wherein a magnetic field is concentrated in an interactive region where the magnetic field captures an actuator and leakage of the magnetic field outside of the interactive region is confined to a limited area.

Another object of the present invention is to provide a magnetic parking device which does not utilize any moving parts other than the actuator arm.

Another object of the present invention is to provide a magnetic parking device which has a greater retention force than prior latch mechanisms utilizing non-physical latching schemes.

These and other objects of the invention are provided in a magnetic parking device in accordance with the present invention. Such a parking device is useful in, for example, a disk drive having a data storage medium, a transducer for reading information from and writing information to the data storage medium, and an actuator for selectively positioning the transducer with respect to the data storage medium. A magnetically permeable capture member is provided on the drive actuator and a magnetic parking means for capturing and magnetically retaining the capture member to park the transducer is provided adjacent the drive actuator. The magnetic parking means may include a permanent magnet and a magnetic field containing member having a slot (or air gap) formed therein. The magnetic field containing member and permanent magnet form a magnetic circuit with a magnetic flux substantially contained within the magnetic field containing member. The slot in the magnetic field containing member allows a portion of the magnetic flux to extend beyond the physical confines of the magnetic field containing member to provide a capture region for the capture member. When the actuator moves into a position where the transducer is over a landing zone, the capture member enters the capture region adjacent the air gap and becomes part of the magnetic circuit formed by the magnetic field containing member and the permanent magnet. A bucking coil is provided, arranged about the magnet, for passing a current to generate a magnetic field with polarity opposite that provided by the permanent magnet to neutralize the magnetic field to release the actuator from the parked state.

DESCRIPTION OF THE PREFERRED EMBODIMENT

The magnetic parking device of the present invention will be described with reference to the preferred embodiments thereof.

A disk drive including a magnetic parking device according to the present invention will be described with reference to FIGS. 1–8. The disk drives described herein include, for example, one or more hard disks with magnetic coating and utilize Winchester technology. The disk drives may utilize various numbers of disks and a corresponding number of heads and the teachings of the invention are not limited in the particular embodiment of the disk drives disclosed herein. Further, the disk drives described herein may utilize other types of disks, for example, optical disks, and other read/write technologies, for example, lasers.

Figure 1:
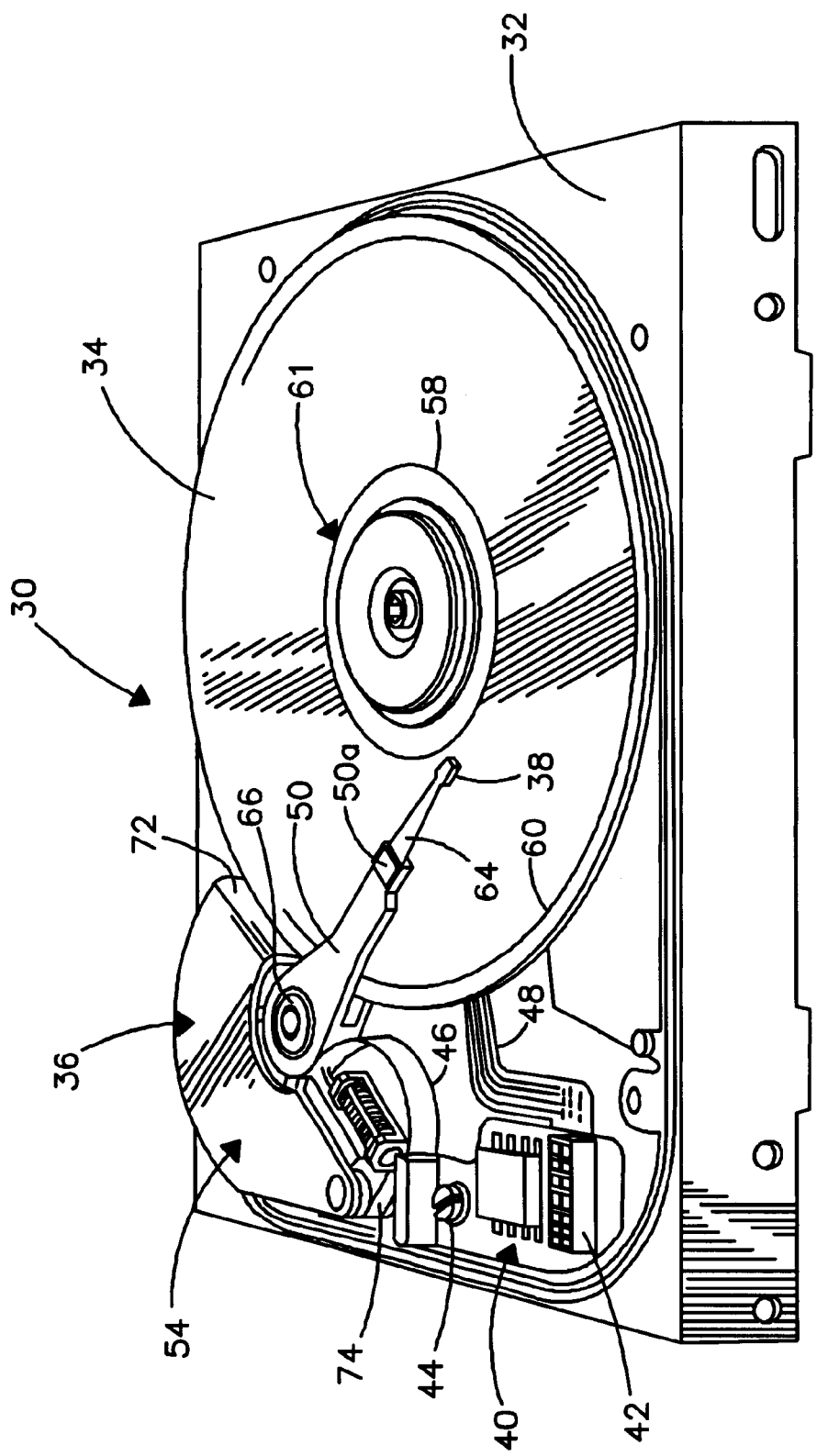
FIG. 1 is an isometric view of a disk drive including a parking device in accordance with a first embodiment of the present invention.

A disk drive 30, including a magnetic parking device in accordance with a first embodiment of the present invention, will be described with reference to FIGS. 1, 2 and 3. For purposes of describing the magnetic parking device of the present invention, disk drive 30 will be described in broad terms. Details of disk drives which may use a magnetic parking device such as those taught herein in place of other latching devices are disclosed in above-identified, co-pending application Ser. No. 527,590, which is hereby incorporated by reference.

Disk drive 30 has a baseplate 32 for supporting internal components of the drive and external electronic circuitry. The internal components may be identified in three interrelated groups: disk 34 mounted by hub 35 to a spin motor (not shown), actuator assembly 36 for positioning head(s) 38 with respect to disk 34, and header assembly 40 including header 42, bracket 44, and flex circuit 46. A cover (not shown) is sealably attached to base plate 32 by mounting screws (not shown) and with gasket 31 placed between base plate 32 and the cover to provide a controlled, sealed internal environment.

Disk 34, which is rotated by the spin motor, includes specified inside and outside diameters 58 and 60, respectively, and a landing zone (or non-data area) 61 located, in one embodiment, adjacent to inside diameter 58. Landing zone 61 may be any selected portion of disk 34; however, a portion of disk 34 adjacent to inside diameter 58 or outside diameter 60 is usually selected.

A printed circuit assembly (or control means, not shown), may be attached to the bottom of base plate 32. The control means provides signals to the drive components to selectively store and retrieve data on disk 34. Header 42 carries electrical signals from the printed circuit assembly 62 to the controlled, internal environment. Disk drive 30 may have an assembled length of about 5.15 inches, a width of about 4 inches, and a total height, including the printed circuit assembly, of about 0.75 inches.

Actuator assembly 36 includes pivotable actuator arm 50, having first arm portion 50a. Heads 38, located on opposite sides of the pivot point of the actuator arm 50, are mounted on load beam(s) 64 at first end 50a of actuator arm 50. Actuator coil 52 is mounted on actuator sub-arms 50-1, 50-2 at a second end of actuator arm 50. Actuator assembly 36 includes a voice coil type actuator motor utilizing a magnet structure 54 for supporting magnet 56. The components of magnet structure 54, described in further detail below, are formed of magnetically permeable material to provide returns for the magnetic flux generated by magnet 56. Magnet structure 54 and actuator coil 52 are arranged so that a current in coil 52, in the presence of the magnetic fields created by magnet 56, creates a force which pivots actuator arm 50. Likewise, currents passing in opposite directions in coil 52 create torques in opposite directions. The pivoting of actuator arm 50 positions head 38 at selected locations with respect to disk 34.

The structure and operation of actuator assembly 36 will be explained with reference to FIGS. 1–4. The function of the actuator assembly 36 is to selectively position heads 38 over individual tracks on disk(s) 34 by pivoting actuator arm assembly 50. Head 38 is supported on actuator arm 50 by a load beam 64 and a flexure (not shown) provided between load beam 64 and heads 38. A bearing assembly 66 is inserted in actuator arm 50 to provide rotational movement about a pivot point at the approximate center of bearing assembly 66. Actuator arm 50, including all of the components attached thereto, is precisely balanced, i.e., equal amounts of weight are provided on either side of the pivot point so that the positioning of heads 38 is less susceptible to linear shock and vibration.

Magnet structure 54, in conjunction with coil 52, comprises a voice coil assembly. Magnet structure 54 includes top and bottom plates 68, 70, arm 72, support structure 74, and bipolar magnet 56 attached to top plate 68. Top plate 68, bottom plate 70, and support structure 74 are formed of magnetically permeable material. Top and bottom plates 68, 70 in conjunction with arm 72 and support structure 74 function as returns for the magnetic flux provided by bipolar magnet 56. It is important that there are no air gaps in the areas adjoining arm 72, support structure 74 and either top plate 68 or bottom plate 70; any air gap would create a discontinuity in the return, greatly reducing the strength of the magnetic field.

Magnet 56 includes regions 56a and 56b providing first and second magnetic fields $\vec{B}_1$, $\vec{B}_2$, between magnet 56 and bottom plate 70. First and second magnetic fields $\vec{B}_1$, $\vec{B}_2$, are encompassed in closed magnetic field loops including various portions of top plate 68, bottom plate 70, arm 72, and support structure 74. By containing magnetic fields $\vec{B}_1$ and $\vec{B}_2$ in returns, the magnetic field intensity of each field is increased in the region between the respective magnet 56 and bottom plate 70. The strength of the magnetic field in the support structure region is directly related to the torque which the voice coil exerts on the actuator arm 50, and thus the rotational velocity of actuator arm 50 and the seek times for the drive.

Crash stops are provided to limit the pivoting movement of actuator arm 50 so that heads 38 travel only between the inside and outside diameters 58, 60 of disk 34. The outside diameter crash stop may be provided by crash stop post 33. When the pivoting motion of actuator arm 50 places heads 38 at the inside diameter 58 of disk 34, capture member 100, mounted on a portion of the actuator latch arm 55, contacts a portion of support structure 74, thereby acting as the inside diameter crash stop.

A flex circuit 46 carries electrical signals from header 42 to heads 38 and actuator assembly 36. The reverse flex circuit 46 may be separated into three portions. A first portion carries current to actuator coil 52; and a second portion is a ground plane separating the current carrying portion from the third, data-carrying portion. The data carrying portion provides signals to heads 38 for recording information on disk 34 and carries signals from the heads 38 to the printed circuit assembly (not shown), via header 42, when reading data from disk 34. The ground plane portion prevents interference with the relatively weak data signals which would otherwise be caused by the larger currents necessary for actuator coil 52 passing through the first portion of the reverse flex circuit 46.

Flex circuit 46 is designed to exert only a minimal amount of rotational force (torque) on actuator arm 50. Any torque exerted on actuator arm 50 by any means other than the voice coil assembly affects the function of actuator assembly 36 in positioning heads 38 with respect to disk 34, particularly the track following and seek functions described in the above-identified co-pending Applications, Ser. Nos. 057,806 and 058,289. The force provided by the voice coil assembly must be controlled to compensate for the force exerted by flex circuit 46. A motor flex circuit 48 is provided for transmitting DC signals to spin motor 35 from header assembly 40, to selectively rotate disk 34.

A magnetic parking device for parking heads 38, i.e., locking actuator arm 50 in an orientation where heads 38 are positioned, for example, at the inside diameter 58 of disk 34, will be described with reference to FIGS. 2–8.

Figure 2:
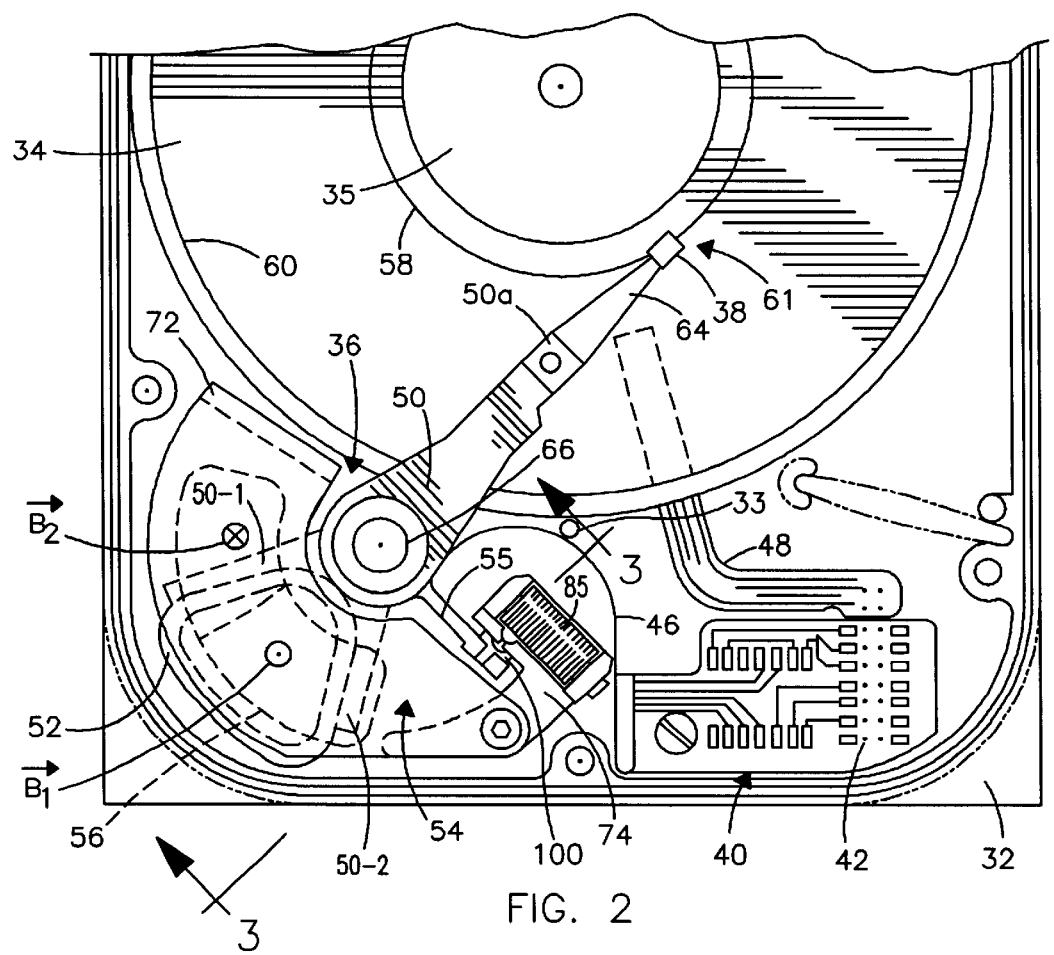
FIG. 2 is a partial plan view of a disk drive including a parking device in accordance with a first embodiment of the present invention.
Figure 3:
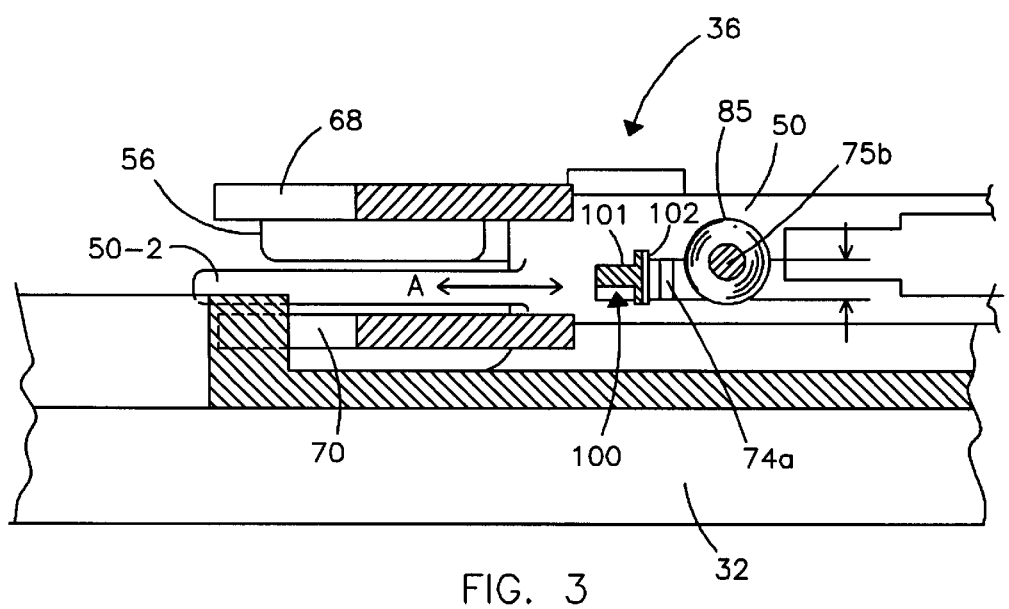
FIG. 3 is a partial end view of the disk drive in FIG. 2 along line 3—3 in FIG. 2.
Figure 4:
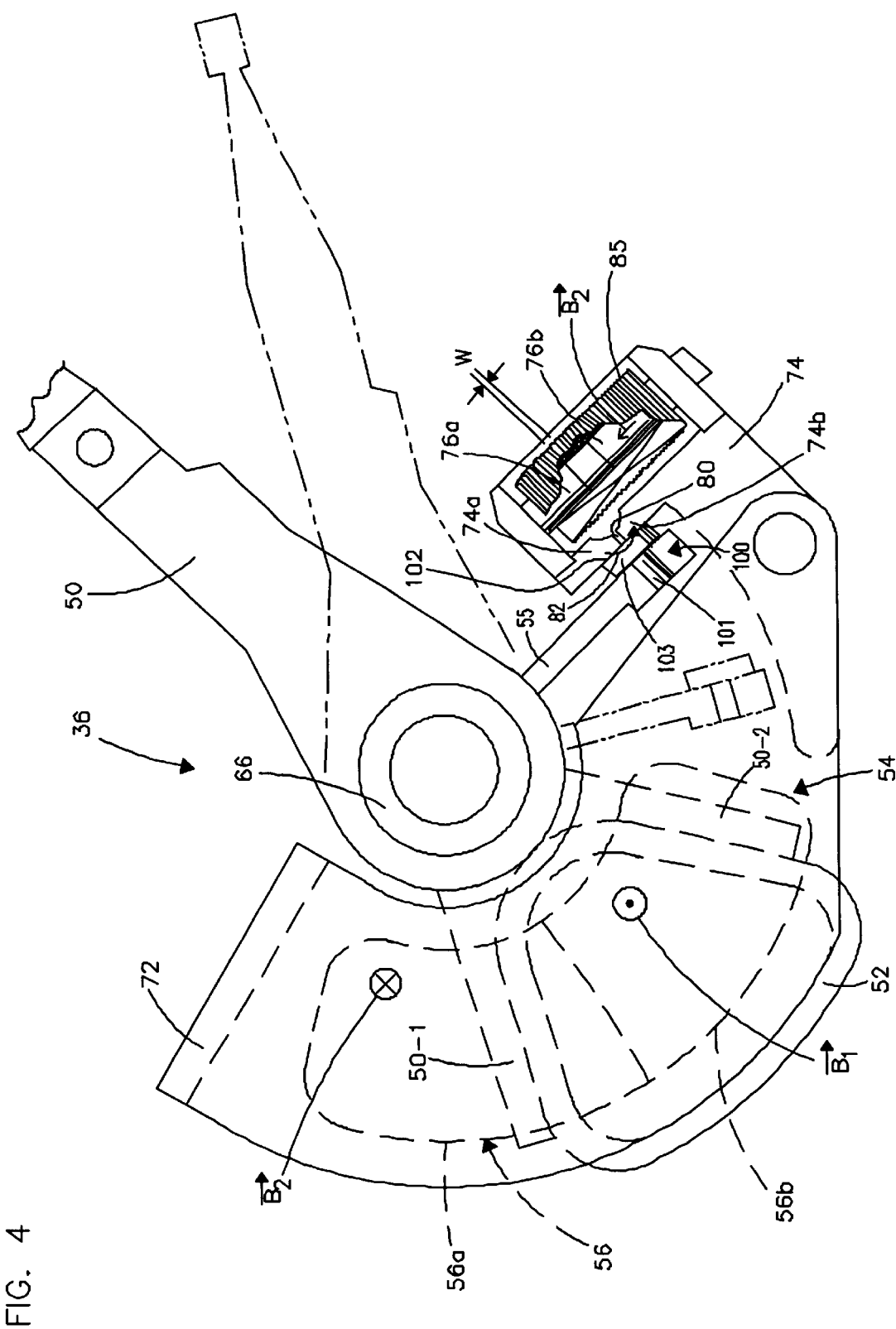
FIG. 4 is a partial, enlarged, cutaway view of an actuator and parking device for securing the actuator in a fixed position in accordance with a first embodiment of the present invention.

With particular reference to FIGS. 2–4, a magnetic parking device in accordance with the present invention includes a magnetically permeable capture member 100 mounted on actuator latch arm 55.

Magnetically permeable capture member 100 may be formed of cold drawn steel having a nonmagnetic electroless nickel finish, or magnetic stainless steel, requiring no nickel finish. In one embodiment, capture member 100 generally has a "T" shape, including a cylindrical center portion 101 engaging disc-portion 103. Disc-portion 103 includes face 102; it is important that face 102 be manufactured to have a smooth, planar surface for engaging tabs 74a and 74b, so that no air gaps are present between the three surfaces when in abutment. Such air gaps would substantially reduce the magnetic retaining force (described below) provided by the magnetic flux (arcs 82) through capture member 100.

As will be appreciated by those skilled in the art, any number of schemes may be utilized to mount capture member 100 on latch arm 55. In one embodiment, capture member 100 is adhesively secured in a groove in latch arm 55. Alternatively, the magnetically permeable capture member may be surrounded by rubber grommet, and actuator latch arm 55 provided with a hooked end portion to secure capture member 100 and rubber grommet. In yet another embodiment, shown in FIG. 6, capture member 100 may be provided through a bore on a portion of actuator arm 50 and secured by a snap ring (132).

As shown in FIGS. 2–4, support structure 74 is provided between one portion of top plate 68 and bottom plate 70 to provide structural rigidity, in conjunction with arm 72, for magnet structure 54. In addition, as shown particularly in FIG. 4, magnet 90 is provided in a portion of support structure 74. Specifically, first and second pins 76a, 76b are positioned through bores in support structure 74, and magnet 90 is positioned between pins 76a, 76b. Bucking coil 85 is provided about pins 76a, 76b and magnet 90. Support structure 74 may be cast of a solid piece of stainless steel or magnesium, or may be assembled from separately cast portions, although precaution must be taken to ensure no air gaps exist between the assembled portions. Tabs 74a and 74b of support structure 74 define an air gap 80 having a length L, and gap width W, where W equals approximately 0.012 inch. Magnet 90 is preferably a 30 Oersted neodymium iron boron magnet which generates a magnetic field $\vec{B}_3$ and forms a magnetic circuit with the support structure 74, including tabs 74a and 74b. The resulting magnetic circuit has a magnetic flux which circulates in the direction of the magnetic field $\vec{B}_3$ and forms a closed loop circuit with a flux path passing through pins 76a, 76b and structure 74, including tabs 74a, 74b.

When the magnetic flux generated by magnet 90 encounters air gap 80 in the magnetic circuit, the magnetic field flux lines pass from tab 74a through air gap 80 to tab 74b in across the width W of air gap 80. Due to the phenomenon known as "fringing," the flux extends outward a small distance into a region adjacent tabs 74a and 74b, shown by example as flux line 82.

Magnetically permeable capture member 100 is mounted on actuator latch arm 55 and moves along axis A, as shown in FIG. 3. The elevation and location of capture member 100 is selected so that the center of face portion 102 of capture member 100 engages tabs 74a and 74b of the approximate center of air gap 80 when actuator arm 50 is rotated to position heads 38 over landing zone 61. When magnetic capture member 100 is positioned outside of the magnetic flux 82, capture member 100 is non-permeated and remains outside the influence of magnetic field $\vec{B}_3$ and the flux 82 fringing about air gap 80. When the control means causes actuator assembly 36 to pivot actuator arm 50 to position heads 38 over landing zone 61, magnetically permeable capture member 100 is brought into contact with tabs 74a and 74b.

Due to the permeability of capture member 100, when actuator arm 50 is positioned such that member 100 contacts tabs 74a and 74b, capture member 100 switches to a permeated state and becomes a component of the magnetic circuit formed by support structure 74, magnet 90, and tabs 74a and 74b. Specifically, as shown in FIG. 4, magnetic flux (82) fringing about air gap 80 permeates magnetic capture member 100. Capture member 100 thus becomes an integral part of the magnetic circuit created by magnet 90 and is retained in position abutting tabs 74a and 74b with a force which is approximately ten times greater than that of previously known magnetic latches.

Figure 5:
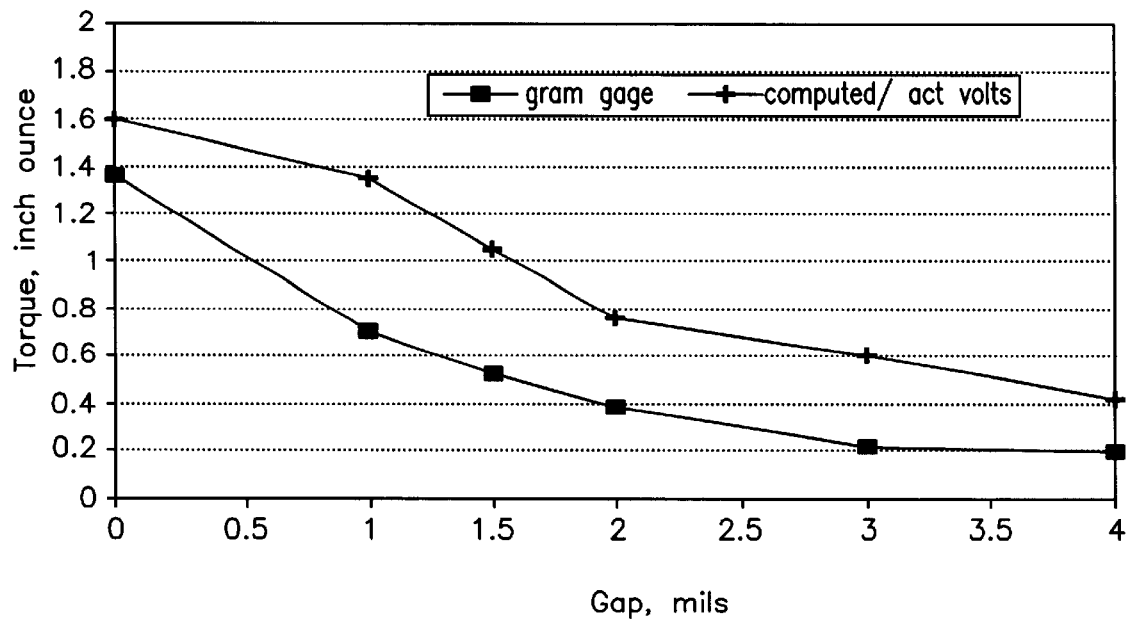
FIG. 5 is a graph depicting the relationship between the holding force and the gap width of the support member of the parking device shown in FIGS. 2–4.

As shown in FIG. 5, the strength of the latch force is dependent upon the width "W" of gap 80. FIG. 5 is a graph of the latch force, in inch-ounces vs. the width "W" of gap 80. As shown therein, the smaller the width of gap 80 the greater the magnitude of the latching force of the parking device. FIG. 5 depicts scaled measurements of the torque required by actuator 50 to overcome the latch force provided at varying gap widths W. The "computed/act(ual) volts" indicia represents the force derived by measuring the amount of voltage which must be applied to actuator coil 52 to remove actuator 50 from the latched position and computing the torque in accordance with well-known principles. The "gram gauge" indicia is measured directly by coupling a gram gauge to actuator arm 50 and, with capture member 100 abutting tabs 74a, 74b, applying a force to the gram gauge which is adequate to release arm 50 from the latched positioned.

It should be noted that the fringing flux (82) about gap 80 creates a relatively small "capture zone". Because the amount of fringing is kept to a minimum, little interference with the movement of actuator arm 50 and the positioning of head(s) 38.

In order to disengage actuator assembly 36 from the parked state, compensation must be made for the greater retaining force provided by the capture member 100 and tabs 74a, 74b. Bucking coil 85 is thus provided to neutralize the magnetic force $\vec{B}_3$, and hence flux 82, provided by permanent magnet 90. Coil 85 is coupled to the control means via header assembly 40. Under the direction of the control means, a current is passed through bucking coil 85 in a direction to generate a magnetic field of opposite polarity to that of magnetic field $\vec{B}_3$ to neutralize the magnetic flux circuit provided by magnetic field $\vec{B}_3$. Preferably, such current is provided for only a split second (for example, 0.10 second,) while the control means simultaneously causes actuator assembly 36 to pivot actuator arm 50 to move capture member 100 along axis A in a direction away from tabs 74a and 74b until such time as capture member 100 is clear of flux 82.

In one embodiment of the invention, magnet 90 is provided to be slidably receivable in the cylindrical area between pins 76a, 76b. In this embodiment, if magnet 90 has a diameter of approximately 0.100 inch and a length of approximately 0.065 inch, bucking coil 85 may be formed of 1100 turns of RSTSL insulated copper wire about pins 76a, 76b. Typically, disk drive 30 is powered by a 5 volt power supply. This provides a bucking coil 85 generating 203 Ampere turns, assuming a wire resistance of 27 ohms.

Figure 6:
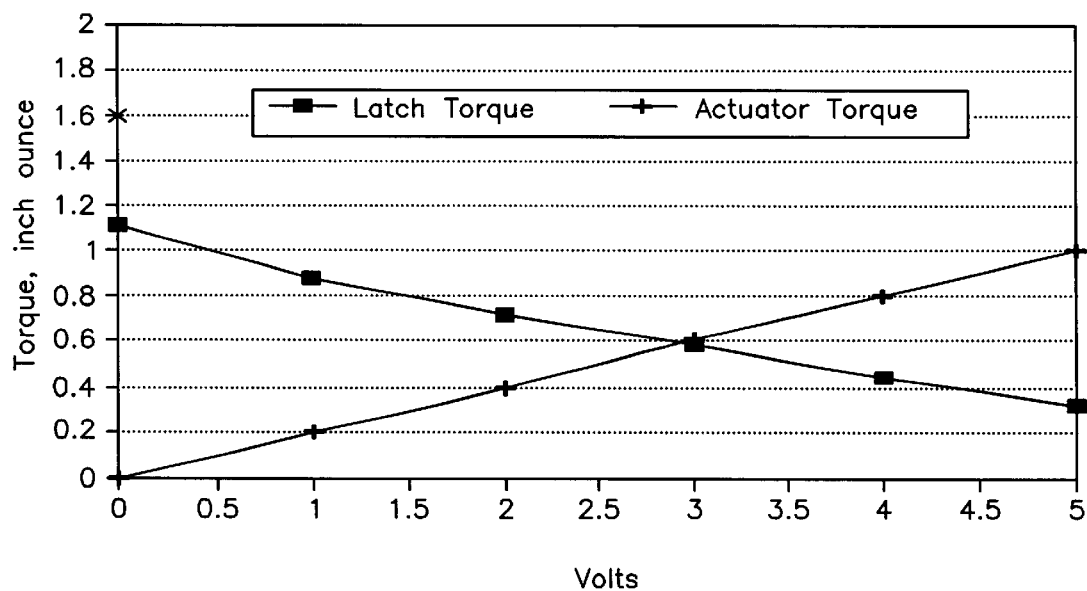
FIG. 6 is a graph depicting the relationship between the holding force and the torque induced on the actuator by the bucking coil voltage used to release the capture member in the actuator latch shown in FIGS. 2–4.

As shown in FIG. 6, assuming the aforementioned dimensions for magnet 90 and bucking coil 85, the amount of voltage applied to coil 85 is shown vs. (1) the "latch torque" i.e., the retentive force that the magnetic parking device, including tabs 74a and 74b, exerts on capture member 100 and actuator body 50 in terms of the torque required to remove body 50 from a latched position; and (2) the "actuator torque," defined as the torque provided by actuator body 50 assuming the specified voltage level is also provided through actuator coil 52. Thus, at 0 volts, the latch torque is approximately 1.1 in-ounce, while the actuator torque is 0 in-ounce. As the voltage in coil 85 and actuator coil 52 increases, the respective indicia converge and eventually cross at approximately 3 volts. As can be seen, the bucking coil generating a magnetic field of opposite polarity to $\vec{B}_3$ thus a provides counteractive force to release actuator body 50 away from tabs 74a, 74b.

Figure 7:
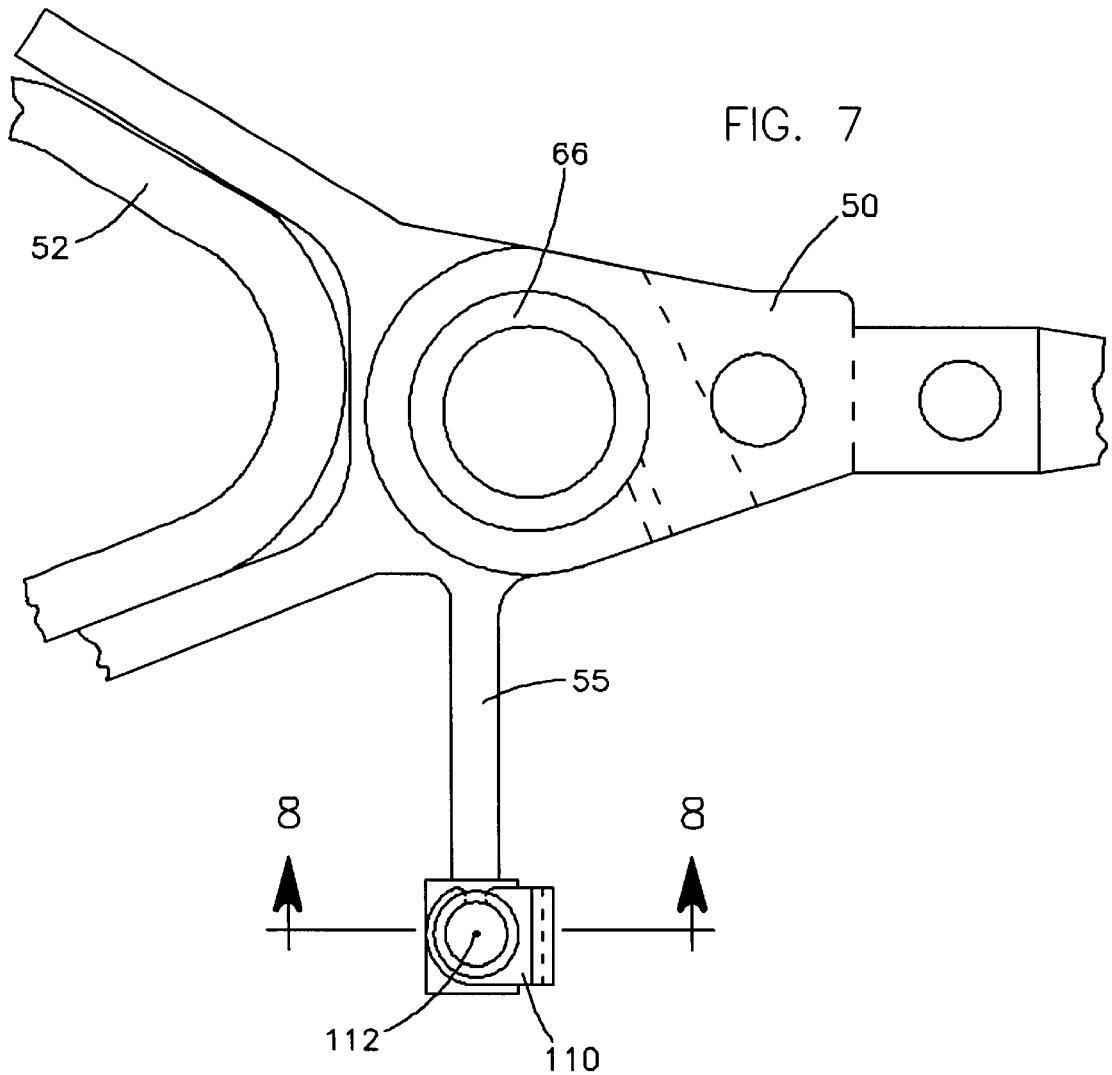
FIG. 7 is an enlarged view of an alternative embodiment of the actuator capture member of magnetic parking device of the present invention.
Figure 8:
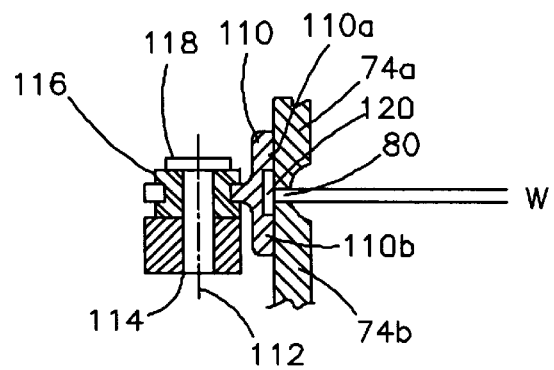
FIG. 8 is a view of the alternative embodiment of capture member along line 8—8 of FIG. 7.

An alternative embodiment of capture member 100 is shown in FIGS. 7 and 8. In FIG. 8, tabs 74a and 74b have been rotated approximately 90° so that the width W of air gap 80 is now parallel to the length of actuator arm 55. FIGS. 7 and 8 detail a capture member 110 which is pivotably mounted on actuator arm 55 about an axis 112. Preferably, a bore 114 is provided in latch arm 55 and capture member 110 is provided through a rubber grommet 116 and secured to latch arm 55 by pin 118. This allows capture member 110 pivot about axis 112 to more accurately align its face against tabs 74a and 74b. Capture member 110 also includes a recess portion 120 which straddles air gap 80 when capture member 110 abuts tab 74a and 74b. The air gap is provided to limit the amount of flux passing through capture member 110 by limiting the contact portion of member 110 to portions 110a and 110b. As the path of the flux passing through capture member 110 generally takes an arcuate path, the deletion of the portion comprising recess portion 120 also allows the face of capture member 110 to more securely abut tabs 74a and 74b.

Control electronics suitable for use in accordance with the disk drive described herein are described in U.S. Pat. No. 4,979,056. To control bucking coil 85, circuitry for controlling the bucking coil to release the actuator coil may be included in the control electronics. A block representation of such circuitry is shown in FIG. 9.

Figure 9:
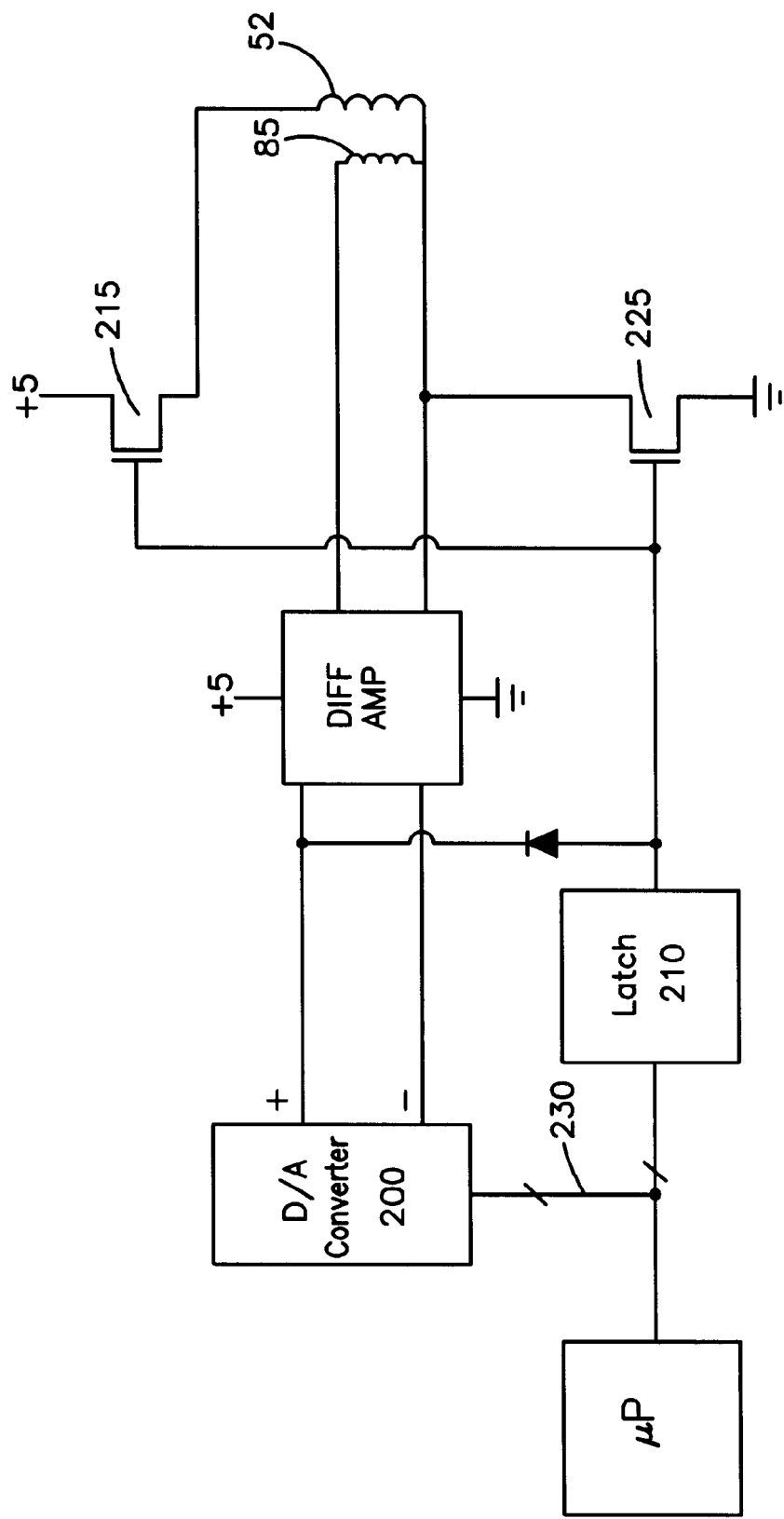
FIG. 9 is a block diagram of the circuitry which may be implemented in the control electronics of a disk drive to control the bucking coil of the latch of the present invention.

In FIG. 9, a microprocessor ($\mu$P) is shown coupled to a digital-to-analog converter 200 and a programmable latch 210 via an address bus 230. Digital-to-analog converter 200 is set by the microprocessor to position the actuator by directing the current in actuator coil 52. As will be generally understood by those skilled in the art, the microprocessor can control the output of digital-to-analog converter 200 and the state of latch 210 by directly writing to their address on bus 230. As noted above, the actuator will be in the latched state when the capture member 100 contacts tabs 74a, 74b. When the actuator is to be unlatched, the microprocessor sets the state of the latch to 1 which drives transistors 215 and 225 to energize bucking coil 85, while simultaneously driving current to actuator coil 52 at full current so as to rapidly move the actuator and pull capture member 100 away from capture member 74. As noted above, this operation takes about 0.10 second.

The many features and advantages of the disk drive of the present invention, including the magnetic latch device incorporated therein, will be apparent to those skilled in the art from the description of the preferred embodiments, the drawings, and the claims. Numerous variations are possible as will be apparent to those skilled in the art. Such variations are intended to be within the scope of the invention as defined by the specification and the following claims are intended to cover all the modifications and variations falling within the scope of the invention.

What is claimed is:

1. A magnetic parking device for a disk drive having a data storage medium mounted on a base, means for reading information from and writing information to the data storage medium, and an actuator assembly, including an actuator body and means for positioning the actuator body, mounted on said base for selectively positioning the means for reading information from and writing information to with respect to the data storage medium, comprising:

a magnetically permeable capture member provided on the actuator body, wherein said magnetically permeable capture member is pivotably mounted on the actuator body, said magnetically permeable capture member having a face portion, said face portion comprising two coplanar surfaces and a recess portion, a magnet for providing a first magnetic field including a first magnetic flux;

a magnetic field containing member defining a path of said first magnetic flux and including an air gap providing a portion of said first magnetic flux extending a predetermined distance into a capture region adjacent the capture member, the capture member being in the capture region when the actuator body is parked;

means for generating a second magnetic field in said field containing member, said second magnetic field having a polarity opposite said first magnetic field and having associated therewith a second magnetic flux having opposite direction to that of said first magnetic flux of said first magnetic field to neutralize the capture region; and control means for generating control signals directing data storage and retrieval, said control means including a first control interface coupled to the means for positioning the actuator body and a second control interface coupled to the means for generating said second magnetic field, wherein said first control interface is adapted to begin providing a movement current to the means for positioning the actuator body at a time when said second control interface begins to provide a field generating current to the means for generating said second magnetic field.

2. A magnetic parking apparatus for a disk drive, said disk drive having a storage medium mounted on a base, at least one interactive means for reading and writing data information to said data storage medium, and an actuator mounted on said base for positioning said interactive mean at a plurality of positions with respect to said data storage medium, comprising:

a magnetically permeable capture member mounted on a portion of said actuator wherein said magnetically permeable capture member is pivotably mounted on the actuator, said magnetically permeable capture member having a face portion, said face portion comprising two coplanar surfaces and a recess portions, a magnetic parking member including a magnet for providing a first magnetic flux substantially contained within said magnetic parking member, said magnetic parking member including a capture region having an air gap formed therein for providing a portion of said first magnetic flux to a region about said air gap;

control means for providing control signals to direct data storage and retrieval, said control means including a first control interface coupled to the actuator and a second control interface, wherein said first control interface is adapted to begin supplying a movement current at a time when said second control interface begins to provide a field generating current; and a coil coupled to said second control interface, said coil being adapted to generate a second magnetic field including a second magnetic flux when said second control interface provides said field generating current, said second magnetic flux having a polarity opposite to the polarity of said first magnetic flux.

3. A parking device for a disk drive having a data storage medium mounted on a base, head means for reading information from and writing information to said data storage medium, and an actuator pivotably mounted on said base for positioning said head means with respect to said data storage medium, comprising:

a magnet providing a first magnetic field having a magnetic flux;

a magnetically permeable capture member pivotably mounted on the actuator and, said magnetically permeable capture member having a face portion, said face portion comprising two coplanar surfaces and a recess portion;

a magnetic field containing member mounted with said magnet, said magnetic field containing member including a planar region having a slot formed therein, said slot having a length and width, said slot further being arranged such that said length is substantially perpendicular to the direction of said magnetic flux in said slot, said slot for providing a portion of said first magnetic field to a capture region adjacent to said magnetic field containing member, said capture region being adapted to capture said actuator when said actuator pivots into said capture region;

means for generating a second magnetic field in said magnetic field containing member, said second magnetic field having a polarity opposite said first magnetic field; and control means for generating control signals directing data storage and retrieval, said control means including a first control interface coupled to the actuator and a second control interface coupled to the means for generating said second magnetic field, wherein said first control interface is adapted to begin providing a movement current to the actuator at a time when said second control interface begins to provide a field generating current to the means for generating said second magnetic field.

* * * * *